United States Patent
Sharifi et al.

(10) Patent No.: US 12,518,744 B2
(45) Date of Patent: Jan. 6, 2026

(54) SELECTIVELY MASKING QUERY CONTENT TO PROVIDE TO A SECONDARY DIGITAL ASSISTANT

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 660 days.

(21) Appl. No.: 17/538,766

(22) Filed: Nov. 30, 2021

(65) Prior Publication Data
US 2023/0169963 A1    Jun. 1, 2023

(51) Int. Cl.
| | | |
|---|---|---|
| G10L 15/18 | (2013.01) | |
| G06F 21/62 | (2013.01) | |
| G06N 5/043 | (2023.01) | |
| G10L 15/22 | (2006.01) | |

(52) U.S. Cl.
CPC .......... *G10L 15/1815* (2013.01); *G06F 21/62* (2013.01); *G06N 5/043* (2013.01); *G10L 15/22* (2013.01); *G10L 2015/223* (2013.01)

(58) Field of Classification Search
CPC ................ G10L 15/1815; G10L 15/22; G10L 2015/223; G10L 15/28; G10L 2015/226; G06F 21/62; G06F 3/167; G06N 5/043
USPC ........................................................ 704/255
See application file for complete search history.

(56) References Cited

U.S. PATENT DOCUMENTS

| | | | |
|---|---|---|---|
| 2018/0293484 A1 | 10/2018 | Wang et al. | |
| 2018/0324215 A1* | 11/2018 | Kalia | ...................... H04L 63/20 |
| 2020/0342850 A1* | 10/2020 | Vishnoi | ................... G06F 40/30 |
| 2020/0342874 A1* | 10/2020 | Teserra | ................... G06F 40/35 |

FOREIGN PATENT DOCUMENTS

| | | |
|---|---|---|
| JP | 2020514794 | 5/2020 |
| JP | 2020144275 | 9/2020 |
| WO | 2018067402 | 4/2018 |

(Continued)

OTHER PUBLICATIONS

European Patent Office; International Search Report and Written Opinion issued in Application No. PCT/US2021/063636; 14 pages; dated Aug. 9, 2022.

(Continued)

*Primary Examiner* — Thierry L Pham
(74) *Attorney, Agent, or Firm* — Gray Ice Higdon

(57) ABSTRACT

Systems and methods for obfuscating and/or omitting potentially sensitive information in a spoken query before providing the query to a secondary automated assistant. A general automated assistant may be invoked by a user, followed by a query. The audio data can be processed to omit and/or obfuscate potentially sensitive information before providing one or more processed queries to secondary automated assistants based on a trust metric associated with each of the secondary automated assistants. The trust metric for a secondary automated assistant is indicative of trust in being provided with sensitive information. In response, the automated assistants can generate responses, which can be filtered to provide a response to the user.

19 Claims, 7 Drawing Sheets

(56) References Cited

FOREIGN PATENT DOCUMENTS

WO 2018208506 11/2018

OTHER PUBLICATIONS

European Patent Office; Communication pursuant to Article 94(3) issued in Application No. 21841140.3; 5 pages; dated Nov. 28, 2024.
Intellectual Property India, Examination Report issued in Application No. 202327061888, 8 pages, dated Aug. 8, 2025.

* cited by examiner

SELECTIVELY MASKING QUERY CONTENT TO PROVIDE TO A SECONDARY DIGITAL ASSISTANT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual user interface output.

As mentioned above, many automated assistants are configured to be interacted with via spoken utterances, such as an invocation indication followed by a spoken query. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives spoken and/or typed input from the user, and provides audible and/or graphical responses), and that interfaces with one or more additional components that implement the automated assistant (e.g., remote server device(s) that process user inputs and generate appropriate responses).

Some user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more spoken invocation phrases, which are also known as "hot words/phrases" or "trigger words/phrases". For example, a spoken invocation phrase such as "Hey Assistant," "OK Assistant", and/or "Assistant" can be spoken to invoke an automated assistant.

Often, a client device that includes an assistant interface includes one or more locally stored models that the client device utilizes to monitor for an occurrence of a spoken invocation phrase. Such a client device can locally process received audio data utilizing the locally stored model, and discard any audio data that does not include the spoken invocation phrase. However, when local processing of received audio data indicates an occurrence of a spoken invocation phrase, the client device will then cause that audio data and/or following audio data to be further processed by the automated assistant. For instance, if a spoken invocation phrase is "Hey, Assistant", and a user speaks "Hey, Assistant, what time is it", audio data corresponding to "what time is it" can be processed by an automated assistant based on detection of "Hey, Assistant", and utilized to provide an automated assistant response of the current time. If, on the other hand, the user simply speaks "what time is it" (without first speaking an invocation phrase or providing alternate invocation input), no response from the automated assistant will be provided as a result of "what time is it" not being preceded by an invocation phrase (or other invocation input).

SUMMARY

Implementations described herein relate to determining, based on a trust level associated with a secondary automated assistant, what content, related to a spoken utterance of a user, to provide to the secondary automated assistant for use, by the secondary automated assistant, in resolving the spoken utterance. In those implementations, content provided to a given secondary automated assistant for a given spoken utterance will vary in dependence on the trust level for the given secondary automated assistant. This can result in first content (e.g., that includes audio data capturing the spoken utterance) being provided to a first secondary automated assistant for the given spoken utterance, but different second content (e.g., that obfuscates at least a portion of the audio data, includes an obfuscated version of the audio data, omits at least a portion of the original content) being provided to a second secondary automated assistant for a same instance (or another instance) of the given spoken utterance. For example, the first content can include audio data capturing the spoken utterance, whereas the second content can omit at least a portion of the audio data or include an obfuscated version of the audio data. For instance, the second content can omit the audio data entirely and include only speech recognition results (optionally with certain term(s) removed or obfuscated) that are based on the audio data and/or natural language understanding data that is based on the speech recognition results. As another example, the first content can include all terms from speech recognition of the spoken utterance, whereas the second content can omit or obfuscate some of the terms. In these and other manners, security of user data, that can be directly or indirectly captured in content related to a spoken utterance, can be maintained through alteration of what content is provided to a secondary automated assistant in dependence on its trust level.

Further, in various implementations the trust level can be dynamically adapted over time in dependence on implicit and/or explicit feedback from interactions of a user and/or other user(s) with the secondary automated assistant. For example, a conservative initial trust level can be utilized for a user and for a secondary automated assistant with initial interaction(s) of a user with the automated assistant, but adapted in dependence on feedback of the user during those initial interaction(s). In these and other manners, security of user data can be ensured for initial interaction(s), while also maintained for further interactions and in dependence on the feedback of the user. This can enable, in dependence on the feedback of the user, for richer content to be provided to the secondary automated assistant to be provided for further interactions. The richer content can enable the secondary automated assistant to provide an improved and/or more robust response and/or to generate the response more efficiently. In these and other manners, implementations seek to balance the security of user data with the performance of the secondary automated assistant.

Yet further, in additional or alternative implementations, the trust level can vary, for a given secondary automated assistant, in dependence on a classification of a spoken utterance, term(s) of the spoken utterance, and/or other properties of the spoken utterance. For example, a given secondary automated assistant can have a first trust level for a first classification and a disparate second trust level for a second classification. Additionally or alternatively, selective modification of what content is provided to a secondary automated assistant can occur for only some spoken utterances and bypassed for others (e.g., in dependence on classification(s), term(s), and/or other properties of the spoken utterance). In those additional or alternative implementations, this can enable the secondary automated assistant to at least selectively obtain richer content which, as mentioned above, can result in improved performance of the secondary automated assistant. In these and other manners, such implementations also seek to balance the security of user data with the performance of the secondary automated assistant.

Some implementations disclosed herein are directed to providing, to a secondary automated assistant, a processed query that has been processed to remove and/or mask potentially sensitive information based on a trust level associated with the secondary assistant. For example, various techniques are directed to receiving, by a general automated assistant, an invocation that causes the general automated assistant (also referred to herein as a "primary automated assistant") to be invoked and subsequently receiving, via the invoked general automated assistant, audio data that captures a spoken utterance of a user and that is generated by one or more microphones of the client device. A secondary automated assistant, which is associated with a trust metric, can be selected to process the query. The trust metric can be based on past interactions of one or more users (e.g., the user and/or additional user(s)) with instances of the secondary automated assistant. The audio data can be processed by the general automated based on the trust level to generate a processed query, which can include omitting and/or obfuscating potentially sensitive information of which the secondary automated assistant may not be authorized to access based on its current trust metric. Once a processed query has been generated, the processed query can be provided to the secondary automated assistant.

In some implementations, the user may utter an invocation phrase, such as "OK Assistant", that invokes an automated assistant (herein also referred to as the "initially invoked automated assistant") but that does not explicitly invoke other automated assistants with which the initially invoked automated assistant can at least selectively interact in processing a spoken query received in association with (e.g., immediately following, immediately preceding) the invocation. Thus, the user may specify, based on providing an invocation input that is specific to the initially invoked automated assistant, to utilize the initially invoked automated assistant rather than invoke one of the other automated assistants individually. For example, a first invocation phrase(s) (e.g., "OK Assistant A") can, when detected, exclusively invoke a first automated assistant without invoking any other automated assistant(s). Likewise, a second invocation phrase(s) (e.g., "OK Assistant B"), when detected, can exclusively invoke a second automated assistant and without invoking the initially invoked automated assistant and/or any other automated assistant(s). The initially invoked assistant, when invoked, can at least selectively interact with other automated assistants (i.e., "secondary assistants") in processing input(s) provided in association with the invocation.

The user may utter an invocation phrase and/or otherwise perform one or more actions, such as "OK Assistant", that invokes a primary automated assistant but that does not explicitly invoke other automated assistants with which the primary automated assistant can at least selectively interact in processing a query received in association with (e.g., immediately following, immediately preceding) the invocation phrase. Thus, the user may specify, based on providing an invocation input that is specific to the primary automated assistant, to utilize the primary automated assistant rather than invoke only one of the other automated assistants individually. For example, a first invocation phrase(s) (e.g., "OK Assistant A") can, when detected, exclusively invoke a first automated assistant without invoking the primary automated assistant and/or any other automated assistant(s). Likewise, a second invocation phrase(s) (e.g., "OK Assistant B") when detected, can exclusively invoke a second automated assistant without invoking the primary automated assistant and/or any other automated assistant(s). Other invocation phrase(s) (e.g., "OK Assistant") can, when detected, invoke the primary assistant. The primary assistant, when invoked, can at least selectively interact with the first automated assistant and/or the second automated assistant (i.e., "secondary assistants") in processing input(s) provided in association with the invocation. In some implementations, the primary assistant may be a "meta assistant" or "general automated assistant" that can always interact with one or both of the first automated assistant and second automated assistant and itself lacks one or more automated assistant capabilities such as speech recognition, natural language understanding, and/or fulfilment capabilities.

The primary automated assistant can select a secondary automated assistant to process the spoken query included with the captured audio data. In some implementations, the general automated assistant can select a secondary automated assistant that is capable and/or otherwise configured to generate a response to the spoken query. For example, secondary automated assistants can provide the general automated assistant with its capabilities, such as applications to which a given secondary automated assistant can communicate with, classifications of queries that a secondary automated assistant is capable of responding to, and/or types of information that the secondary automated assistant has authorization to access. Also, for example, the primary automated assistant can select a secondary automated assistant based on the preferences of the user (e.g., a user explicitly indicating to utilize a particular automated assistant to process a specific class of queries), historical interactions of the user with one or more of the secondary automated assistants, past responses provided by the secondary automated assistants, and/or other information that indicates which, of a plurality of secondary automated assistants, is most likely and/or most appropriate to generate a response to a given query.

In some implementations, one or more secondary automated assistants can be associated with a trust metric that is indicative of trust that has been established with a given secondary automated assistant. For example, a secondary automated assistant may originate from a trusted source and be assigned a trust metric based on the trust (or lack thereof) of the source. Also, for example, a trust metric can be based on determining pertinence of responses previously provided by the secondary automated assistant. Also, for example, a trust metric can be based on previous interactions of the user with a secondary automated assistant such that, if a user continues to directly interact in some instances with a given automated assistant, the secondary automated assistant may be assigned a trust metric that reflects the level of trust the user has indicated based on the continued interactions. Also, for example, a secondary automated assistant can be provided with a trust metric and/or other indication of the trustworthiness of the automated assistant in handling and/or requiring potentially sensitive information. In some implementations, a trust metric for a secondary automated assistant can be specific to a particular user. In some implementations, a trust metric for a secondary automated assistant can be indicative of trust in the automated assistant over a larger population of users.

Based on the trust metric of the selected automated assistant, the original spoken utterance captured in the audio data can be processed to generate a processed query that includes only information that is authorized for an automated assistant with the associated trust metric. Processing the spoken utterance can include, for example, removing identifying information of the user that uttered the spoken query, omitting sensitive information that is included with the spoken utterance, obfuscating some of the information that is included in the audio data and/or a textual representation of the audio data, providing intent of the spoken query without providing the audio data, and/or other processes that can mask and/or otherwise prevent the automated assistant from accessing particular information.

In some implementations, processing the original audio data can include generating a textual representation of the spoken query. For example, the primary automated assistant can receive a spoken query and perform STT processing on the audio data to generate text that includes the information spoken by the user. In some implementations, the textual representation can be provided to the selected secondary automated assistant for further processing and/or the secondary automated assistant can utilize the textual representation of the audio data to generate a processed query. In some implementations, the primary automated assistant can determine, based on the audio data and/or the textual representation of the audio data, that a portion of the query uttered by the user is information that is sensitive and/or is not required by the automated assistant. For example, the audio data may include a portion of utterances, either by the user or by one or more other speakers, that are not a part of the query. Also, for example, the audio data may include a credit card number, an address, other identifying information (e.g., name of the user), and/or information that may not be appropriate to provide to the selected automated assistant based on the trust metric of the secondary automated assistant. Primary automated assistant can remove those portions when generating a textual representation of the audio data before providing the textual representation to the secondary automated assistant as the processed query.

In some implementations, the audio data can be directly provided to the secondary automated assistant with some portion of the audio data obfuscated and/or otherwise rendered unusable by the secondary automated assistant. For example, the primary automated assistant can filter out background noise, filter spoken utterance(s) that are captured in the audio data but not from the user, and/or filter audio that includes sensitive information that the selected secondary automated assistant is not authorized to be provided. Obfuscating audio data can include, for example, inserting noise into the audio data that masks the sensitive information, removing portions of the audio data to generate the processed audio data, and/or otherwise processing the audio data to prevent the secondary automated assistant from performing speech analysis on the sensitive portions of the audio data. Further, the audio data can be further obfuscated by altering the audio data to mask the voice of the speaker, such as utilizing a bandwidth filter, one or more trained machine learning models, and/or other process to alter the prosodic features of the spoken query and/or other portion of the audio data to generate the processed query.

In some implementations, the primary automated assistant can perform natural language understanding on the audio data (or textual representation of the audio data) and provide only an intent of the query without providing the textual representation or the original audio data. For example, the user may utter the query "OK Assistant, are there any restaurants with dinner reservations near my house?" The primary automated assistant can determine that the user intends to make a dinner reservation and further identify a secondary automated assistant that is configured to access a reservation application. The intent can be provided to the secondary automated assistant, but instead of providing a specific location for the user (e.g., an address of the user), the primary automated assistant may provide just a request for dinner reservations and/or provide a generalized location of the user (e.g., city and state of the user, neighborhood of the user) without a specific address.

In some implementations, the primary automated assistant can provide a query to multiple secondary automated assistants. For example, a primary automated assistant can be configured to provide queries to a first automated assistant and a second automated assistant, each with an associated trust metric. Based on the trust metric of each of the secondary automated assistants, different processing of the query may be performed to generate varied processed queries.

As a non-limiting example, for a trust level above a threshold value (herein referred to as an automated assistant with a "high" trust metric), the primary automated assistant may provide the full, unmodified audio data to the secondary automated assistant, which can perform ASR and/or NLU on the audio data. For an automated assistant with a trust metric between the high threshold value and a lower threshold value (herein referred to as a "medium" trust metric automated assistant), the primary automated assistant can process the audio data to remove, obfuscate, and/or anonymize some sensitive portions of the audio data while still providing audio data to the secondary automated assistant. For a "low" trust metric automated assistant (e.g., with a trust metric lower than a medium trusted automated assistant), a textual representation of the audio data, either in its entirety or with some information omitted, obfuscated, and/or anonymized, can be provided to the secondary automated assistant. In instances where a trust metric for a secondary automated assistant is below a "low" threshold, the secondary automated assistant may not be provided a processed query at all and/or the secondary automated assistant can be blocked from receiving subsequent queries. This can include, for example, uninstalling or disabling the secondary automated assistant. By blocking automated assistants that fall below a trust level, the primary automated assistant does not consume computing resources by processing a query and/or providing a query to a secondary automated assistant that ultimately will not be utilized to provide a response, thus conserving resources for processing audio data for other secondary automated assistants that may be utilized as described herein.

Once audio data that includes a spoken query has been processed, the processed query can be provided to one or more secondary automated assistants. For example, the primary automated assistant may provide a processed query to three secondary automated assistants: one with a high trust metric, one with a medium trust metric, and one with a low trust metric. For the secondary automated assistant with a high trust metric, the spoken query can be provided as audio, thus allowing the secondary automated assistant to perform additional processing (e.g., ASR, NLU). For the secondary automated assistant with a medium trust metric, the processed query can be audio data with some portion omitted and/or otherwise obfuscated. For the secondary automated assistant with a low trust metric, the primary automated assistant can perform automatic speech recognition on the audio data and provide a textual representation, either in its entirety or with a portion of the text removed and/or anonymized.

In response to providing the processed audio data, each of the secondary automated assistants can provide a response to the processed query. In some implementations, the response from a secondary automated assistant can be provided by the device that is executing, at least in part, the secondary automated assistant. In some implementations, the response of a secondary automated assistant can be provided to the primary automated assistant for further analysis. For example, a secondary automated assistant may generate a response to a processed query and provide the response to the primary automated assistant, which can provide the response to the user, such as via an interface and/or via synthesized speech.

In some implementations, the primary automated assistant can determine, based on the trust metric that is associated with the originating secondary automated assistant, whether to provide the response to the user. Additionally or alternatively, the primary automated assistant can filter responses of secondary automated assistants to prevent a given secondary automated assistant from providing information and/or requesting additional information that the secondary automated assistant, given its trust metric, is not authorized to provide and/or request. As an example, a secondary automated assistant may, as a response, request additional information from the user, such as permission to make a purchase and/or request credit card information to complete a purchase. However, if the primary automated assistant determines that the trust metric for the secondary automated assistant falls below a threshold value, the primary automated assistant may determine that the secondary automated assistant is not authorized to make a purchase and/or be provided with credit card information. In response, the primary automated assistant can prevent the response of the secondary automated assistant from being provided to the user.

In some implementations, the primary automated assistant can adjust a trust metric that is associated with a secondary automated assistant. For example, a secondary automated assistant can generate a response to a query that requests additional information. Once the response is provided to the user, the user may opt not to respond positively to the response (e.g., ignore the response, explicitly deny the response, ask a follow-up question). In response, the primary automated assistant may lower the trust metric of the secondary automated assistant that provided the response that requested additional information. Thus, in subsequent interactions, that secondary automated assistant is less likely to be permitted to request additional information from the user.

In some implementations, the primary automated assistant can compare responses from multiple automated assistants and adjust the trust metric of one or more of the secondary automated assistants based on similarity between the responses. For example, the primary automated assistant may receive three responses, each from a secondary automated assistant. Based on the content of the responses, the primary automated assistant may determine that the first and second automated assistants provided similar responses. In this case, one or both of the trust metrics of the first and second secondary automated assistants may be adjusted. For the third secondary automated assistant, the trust metric may be lowered and/or otherwise adjusted to reflect that its response was not similar to other responses.

In some implementations, where a response of a secondary automated assistant with a high trust metric is similar to a secondary automated assistant with a lower trust metric, the value of the lower trusted automated assistant may be increased to reflect that its response is similar to a higher trusted secondary assistant. In some implementations, where a response from a secondary automated assistant is not similar to a response of a higher trusted automated assistant, the trust metric of the lower trusted secondary automated may be adjusted to a lower value to reflect that its response(s) may not be responsive to the query. For example, the lower trusted secondary automated assistant may be a malicious automated assistant and/or may be otherwise providing incorrect information to the user.

In some implementations, the primary automated assistant can determine if, in instances where a secondary automated assistant is requesting additional information, whether the requested additional information is pertinent for the query of the user. For example, a user may request the automated assistant to make a dinner reservation. In response, a secondary automated assistant may request the social security number of the user. The primary automated assistant may determine that a social security number is not necessary for a dinner reservation request and prevent the response from being provided. Further, the primary automated assistant may lower the trust metric of the secondary automated assistant and/or block the secondary automated assistant from providing future responses. Conversely, if the secondary automated assistant requests a telephone number of the user in a response, the primary automated assistant can determine that a phone number is personal information that may be required to make a dinner reservation and allow the response to be provided to the user. Further, the primary automated assistant may adjust the trust metric of the secondary automated assistant based on the response of the secondary automated assistant being responsive to the request of the user.

In some instances, a secondary automated assistant may not provide a response to a processed query. In some instances, this may be because the secondary assistant is not configured to respond to the type of query that was provided by the user. For example, a query may be to make a dinner reservation. A secondary automated assistant that is not configured to access a reservation application may not provide a response and/or may provide a negative response (e.g., "I'm sorry, I can't do that"). In some implementations, the trust metric of the secondary automated assistant may be lowered to reflect its non-responsiveness when a response is expected. However, in instances where particular automated assistants may not be required to provide a response, the trust metric of those automated assistants may not be adjusted. This can be facilitated by the primary automated assistant by, instead of assigning a single trust metric to a secondary automated assistant, multiple trust metrics may be assigned that each reflect a different classification of queries. Thus, if a secondary automated assistant that is configured to access a reservation application does not respond, its trust level for reservation queries may be reduced, whereas a secondary automated assistant that is not configured to access a reservation application may not be affected for reservation queries.

In some implementations, a secondary automated assistant may provide a response to the primary automated assistant that mimics the behavior and/or a response of another secondary automated assistant. For example, for a response that is in the form of synthesized speech, the secondary automated assistant may utilize a voice that is similar or the same as a different automated assistant. This can occur inadvertently or maliciously, but in either case, the user may provide information to a different secondary automated assistant than the intended secondary automated assistant. In those instances, the primary automated assistant may detect the similarity between the responding automated assistant and another automated assistant and prevent the response of the lower trusted secondary response from being provided to the user. Also, for example, the primary automated assistant may perform further processing on the lower trusted secondary assistant to better inform the user of the source of the additional request. For example, the primary automated assistant may include an identifier of the origin of a request, change the speech synthesis to a different voice, and/or include other information with the responding request to indicate the secondary automated assistant of origin.

In some implementations, the trust metric for automated assistants can be stored as a numerical value and/or trust level (e.g., high, medium, low), and the user can be provided with an indication of the trust metric for a responding secondary automated assistant. For example, the primary automated assistant can cause a numerical value to be displayed via an interface that reflects trust in the origin of the response. Thus, the user can indicate whether a response is appropriate for the provided query. Further, in instances where the user does not follow up with a response or does not further interact with the responding automated assistant, the primary automated assistant can adjust the trust metric of the responding automated assistant to reflect that the user may not have interest in future responses from that automated assistant.

In some implementations, responses and trust metrics of secondary automated assistants can be aggregated over multiple instances of the secondary automated assistants. For example, a first user can interact with a secondary automated assistant in a negative manner (e.g., not respond, respond negatively) and the trust metric of an instance of the secondary automated assistant for a second user may also be adjusted to reflect the negative response of the first user. Also, for example, a first primary automated assistant may determine that a secondary automated assistant is potentially malicious based on its responses and the trust metric of all instances of that malicious secondary automated assistant may be lowered such that it does not receive subsequent queries, is not permitted to provide responses to the user, and/or is suggested to be uninstalled for all users of the malicious secondary automated assistant.

The above description is provided as an overview of some implementations of the present disclosure. Further description of those implementations, and other implementations, are described in more detail below.

DETAILED DESCRIPTION

Figure 1:
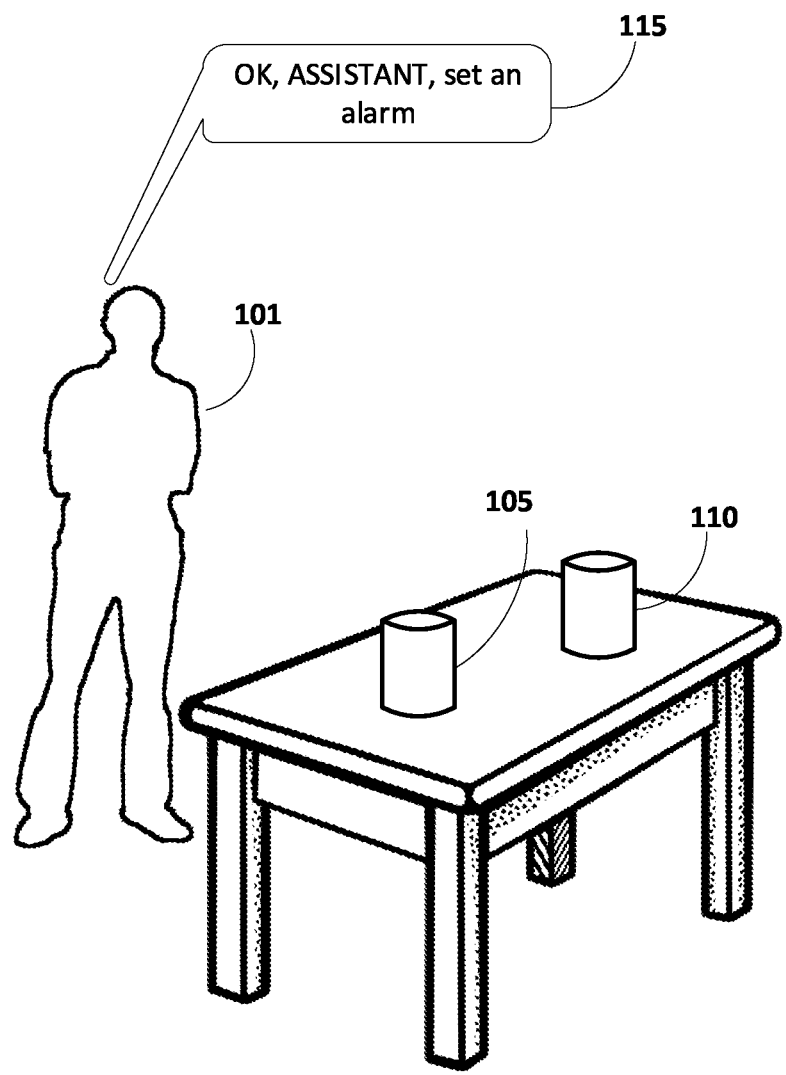
FIG. 1 is an illustration of an example environment in which implementations disclosed herein can be implemented.

Referring to FIG. 1, an example environment is provided which includes multiple automated assistants that may be invoked by a user 101. The environment includes a first standalone interactive speaker 105 with a microphone (not depicted) and a second standalone interactive speaker 110 with a microphone (also not depicted). The first speaker may be executing, at least in part, a first automated assistant that may be invoked with an invocation phrase. The second speaker 110 may be executing a second automated assistant that may be invoked with an invocation phrase, either the same invocation phrase as the first automated assistant or a different phrase to allow the user, based on the phrase uttered, to select which automated assistant to invoke. In the example environment, the user 101 is speaking a spoken utterance 115 of "OK Assistant, set an alarm" in proximity to the first speaker 105 and the second speaker 110. If one of the first and/or second automated assistants is configured to be invoked by the phrase "OK Assistant," the invoked assistant may process the query that follows the invocation phrase (i.e., "set an alarm").

In some implementations, an invocation can include one or more non-verbal actions from the user that indicate an interest, by the user, in invoking a particular automated assistant. For example, a user may press a button on a device, make a gesture in the presence of a camera of a device that is executing the automated assistant, and/or other action that can be identified by one or more sensors of the client device that is executing, at least in part, an automated assistant. In some implementations, differing gestures and/or actions can each be an invocation for a different automated assistant. For example, the user can wave in the direction of a device that is executing an automated assistant to indicate an interest in invoking a first automated assistant, and the user can press a button on the device to indicate an interest in invoking a second automated assistant.

Figure 2:
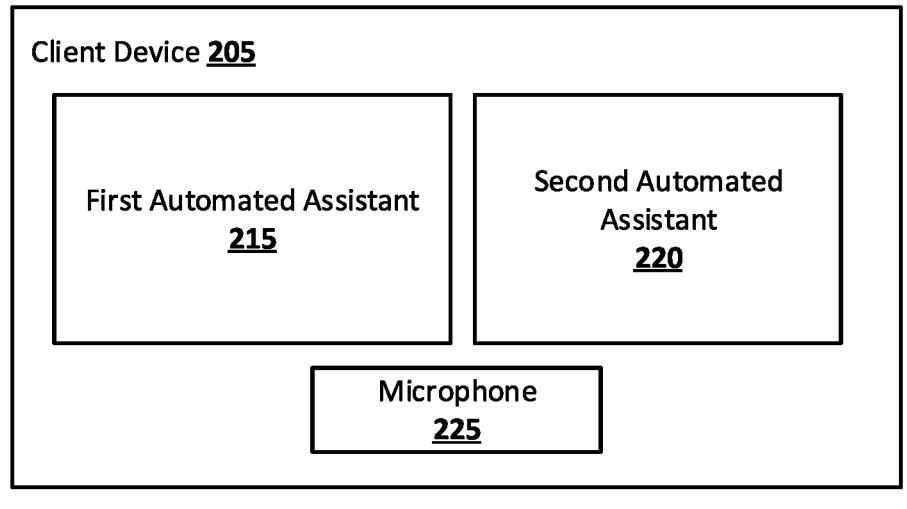
FIG. 2 is a block diagram of an example environment in which various methods disclosed herein can be implemented.
Figure 2:
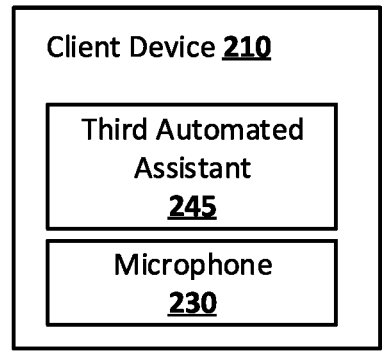

In some implementations, a device, such as first speaker 105, may be executing multiple automated assistants. Referring to FIG. 2, an example environment is illustrated that includes multiple client devices executing multiple automated assistants. The system includes a first client device 205 that is executing a first automated assistant 215 and a second automated assistant 220. Each of the first and second automated assistants may be invoked by uttering an invocation phrase (unique to each assistant or the same phrase to invoke both assistants) proximate to the client device 205 such that the audio may be captured by a microphone 225 of client device 205. For example, user 101 may invoke the first automated assistant 215 by uttering "OK Assistant 1" in proximity to the client device 205, and further invoke the second automated assistant 220 by uttering the phrase "OK Assistant 2" in proximity to client device 205. Based on which invocation phrase is uttered, the user can indicate which of the multiple assistants that are executing on the first client device 205 that the user has interest in processing a spoken query. The example environment further includes a second client device 210 that is executing a third automated assistant 245. The third automated assistant 245 may be configured to be invoked using a third invocation phrase, such as "OK Assistant 3" such that it may be captured by microphone 230. In some implementations, one or more of the automated assistants of FIG. 2 may be absent. Further, the example environment may include additional automated assistants that are not present in FIG. 2. For example, the system may include a third device executing additional automated assistants and/or client device 210 and/or client device 205 may be executing additional automated assistants and/or fewer automated assistants than illustrated.

Each of the automated assistants 215, 220, and 225 can include one or more components of the automated assistants described herein. For example, automated assistant 215 may include its own audio capture component to process incoming queries, visual capture component to process incoming visual data, hotword detection engine, and/or other components. In some implementations, automated assistants that are executing on the same device, such as automated assistants 215 and 220, can share one or more components that may be utilized by both of the automated assistants. For example, automated assistant 215 and automated assistant 220 may share an on-device speech recognizer, on-device NLU engine, and/or one or more of the other components.

Figure 3A:
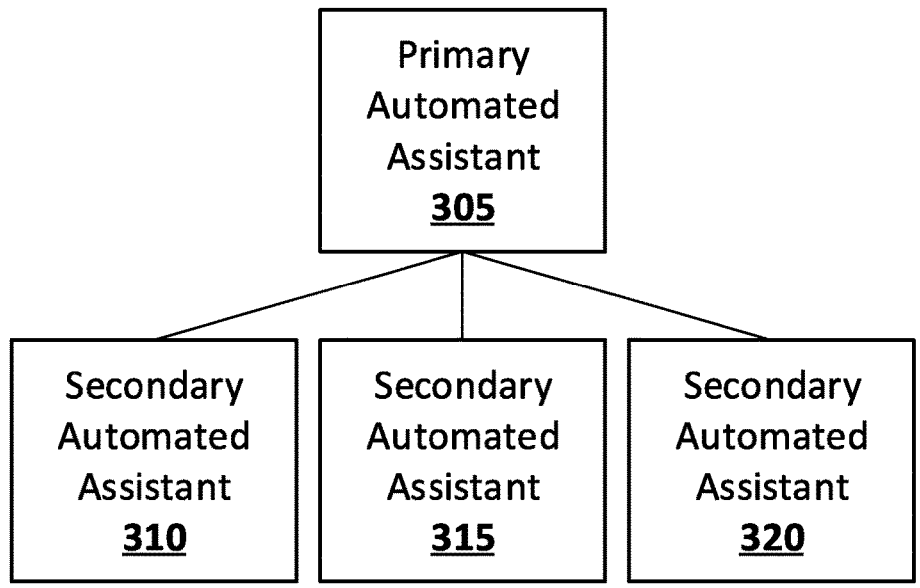
FIG. 3A and FIG. 3B are block diagrams of another example environment in which various methods disclosed herein can be implemented.

In some implementations, one or more of the automated assistants may be invoked by a general invocation phrase and/or action, such as "OK Assistant," that does not individually invoke any of the other automated assistants separately. When the user utters a general invocation phrase, one or more of the automated assistants may function as a primary automated assistant and coordinate responses between the other automated assistants. Referring to FIG. 3A, a primary automated assistant 305 is illustrated along with secondary automated assistants 310, 315, and 320. The primary automated assistant may be invoked with the phrase "OK Assistant" or another general invocation phrase, which may indicate that the user has interest in providing a query to multiple automated assistants. Similarly, the secondary automated assistant 310 and 315 may each have one or more alternative invocation phrases that, when uttered by a user, invoke the corresponding automated assistant. For example, secondary automated assistant 310 may be invoked with the invocation phrase "OK Assistant A" and secondary automated assistant 315 may be invoked with that invocation phrase "OK Assistant B." In some implementations, one or more of primary automated assistant 305, and secondary automated assistants 310 and 315 may be executing on the same client device, as illustrated in FIG. 2 with regards to first automated assistant 215 and second automated assistant 220. In some implementations, one or more secondary automated assistants can be executing on separate devices, as illustrated in FIG. 2 with regards to third automated assistant 245.

In some implementations, the primary automated assistant 305 can be a "meta assistant" that can always interact with one or both of the secondary automated assistants 310 and 315 and can itself lack one or more automated assistant capabilities such as speech recognition, natural language understanding, and/or fulfilment capabilities. In other instances, the primary automated assistant can both interact with the secondary assistants while also performing its own query processing to determine responses to a query. For example, as described further herein, primary automated assistant 305 can include a query processing engine or the primary automated assistant 305 may not be configured to process queries and provide responses to the user.

Other components of automated assistant 305, 310, and 315 are optional, and can include, for example, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client devices executing the automated assistants may be relatively constrained in terms of computing resources (e.g., processor cycles, memory, battery, etc.), the local components may have limited functionality relative to any counterparts that are included in any cloud-based automated assistant components that are executing remotely in conjunction with the automated assistant(s).

Referring again to FIG. 2, in some implementations, one or more of the automated assistants 215, 220, and/or 245 may be invoked by one or more gestures that indicate that the user has interest in interacting with the primary automated assistant. For example, a user may demonstrate intention to invoke an automated assistant by interacting with a device, such as pressing a button or a touchscreen, perform a movement that is visible and may be captured by an image capture device, such as a camera, and/or may look at a device such that the image capture device can recognize the user movement and/or positioning. When a user performs a gesture or action, the automated assistant may be invoked and begin capturing audio data that follows the gesture or action, as described above.

In some implementations, one automated assistant may be selected as the primary assistant and one or more other automated assistants may be designated as the secondary assistant(s). For example, a user can utter an invocation phrase that is common to multiple automated assistants that are proximate to the user. One or more components can determine which of the plurality of devices that are executing the automated assistants is the closest to the user and that closest automated assistant may be designated as the primary automated assistant, with the other automated assistants being designated as the secondary assistants. Also, for example, when a user invokes an automated assistant, one or more components may determine which automated assistant has been utilized most frequently by the user and designate that automated assistant as the primary automated assistant.

In some implementations, the user can invoke a particular automated assistant with an invocation that is unique to that automated assistant, and that automated assistant may be designated as the primary automated assistant. For example, a user may utter the invocation phrase "OK Assistant 1" to invoke first assistant 215 that is then designated as the primary automated assistant. Other automated assistants, such as second automated assistant 220 and third automated assistant 245 can then be invoked by the primary automated assistant, be provided a query by the primary automated assistant, and/or can receive responses from other automated assistants, as described herein.

In some implementations, one or more automated assistants, such as first automated assistant 215 and second automated assistant 220, may share one or more modules, such as a natural language processor and/or the results of a natural language, US, and/or SU processor. For example, referring again to FIG. 2, both first automated assistant 215 and second automated assistant 220 may share natural language processing so that, when client device 205 receives audio data, the audio data is processed once into text that may then be provided to both automated assistants 215 and

220. Also, for example, one or more components of client device 205 may process audio data into text and provide the textual representation of the audio data to third automated assistant 245, as further described herein. In some implementations, the audio data may not be processed into text and may instead be provided to one or more of the automated assistants as raw audio data.

Figure 3B:
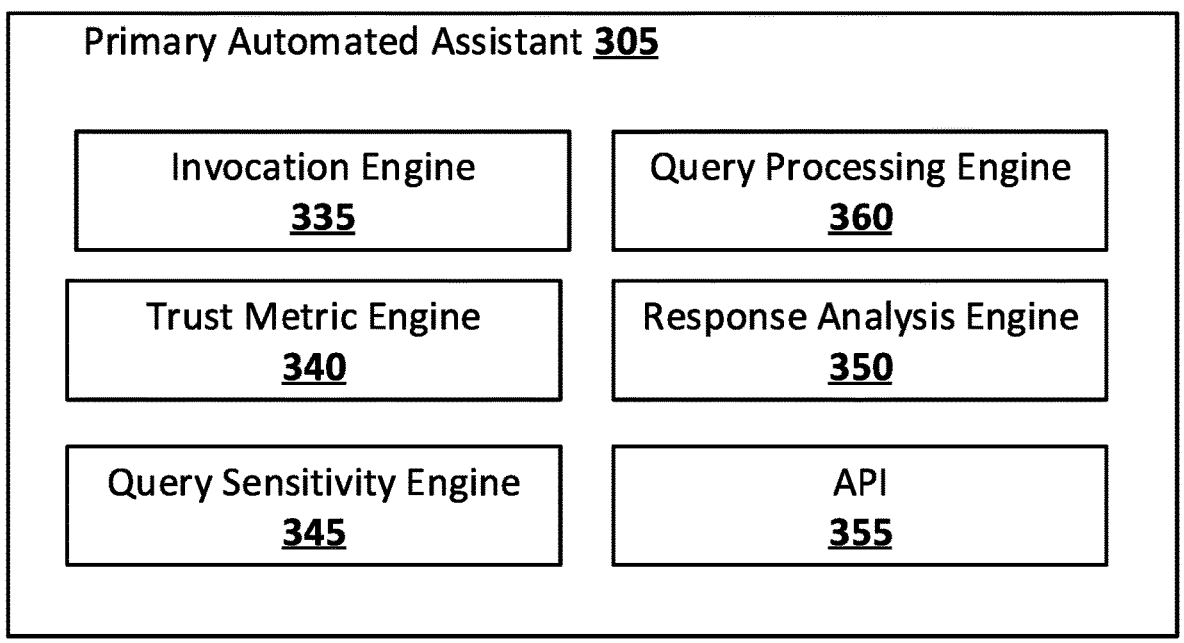

Referring to FIG. 3B, components of primary automated assistant 305 are illustrated. As previously described, the primary automated assistant 305 can include additional components other than the components illustrated in FIG. 3B. Additionally or alternatively, one or more components may be absent from primary automated assistant 305. For example, primary automated assistant 305 may include a query processing engine and perform as both the primary automated assistant as well as a secondary automated assistant.

Invocation engine 335 is operable to detect one or more spoken invocation phrases, and invoke the primary automated assistant 305 in response to detecting one of the spoken invocation phrases. For example, the invocation engine 335 can invoke the primary automated assistant 305 in response to detecting a spoken invocation phrase such as "Hey Assistant," "OK Assistant", and/or "Assistant". The invocation engine 335 can continuously process (e.g., if not in an "inactive" mode) a stream of audio data frames that are based on output from one or more microphones of the client device executing the primary automated assistant 305, to monitor for an occurrence of a spoken invocation phrase. While monitoring for the occurrence of the spoken invocation phrase, the invocation engine 335 discards (e.g., after temporary storage in a buffer) any audio data frames that do not include the spoken invocation phrase. However, when the invocation engine 335 detects an occurrence of a spoken invocation phrase in processed audio data frames, the invocation engine 335 can invoke the primary automated assistant 305.

Once the primary automated assistant 305 has been invoked, a spoken utterance by the user that includes a query can be received by the primary automated assistant 305. The query may precede, follow, and/or by provided concurrently with the invocation of the primary automated assistant 305. In some implementations, the spoken utterance can be processed into a textual representation utilizing a STT component. Additionally or alternatively, the spoken utterance can be processed to generate natural language understanding of the query included in the spoken utterance (e.g., determine intent, a classification for the query, one or more parameters).

In some implementations, primary automated assistant 305 can classify the query based on the textual representation and/or natural language understanding output. For example, for a query of "how tall is the president," primary automated assistant 305 can determine that the user is interested in an answer to a question, and classify the query as an "answers" query. Also, for example, for a submitted query of "make me a dinner reservation at 7 pm," primary automated assistant 305 can determine that the user is interested in making a dinner reservation and classify the query as "reservations." Classification by the primary automated assistant can be performed based on, for example, context of a query, one or more terms of the query, and/or other indications of the intent of the user.

In some implementations, primary automated assistant 305 can identify one or more secondary automated assistants that are capable of processing a query that is received from the user. In some implementations, one or more secondary automated assistants can provide an indication to the primary automated assistant 305 of the types of queries that it can process and/or the applications with which it can interact. For example, referring again to FIG. 3A, secondary automated assistant 310 may be configured to interact with a reservation application, and can provide, to primary automated assistant 305, an indication that it is capable of processing "reservation" queries. Also, for example, a secondary automated assistant may be configured with a query processing engine that can process general information queries and provide an indication to the primary automated assistant 305 that it can process "answers" queries. Thus, primary automated assistant 305 can provide queries only to those secondary automated assistants that are configured to handle the classification of query that is received from the user.

The primary automated assistant 305 can provide a processed query, as described further herein, to secondary assistants 310, 315, and/or 320, which then can process the query to determine a response to the query. In some implementations, the primary automated assistant may provide the query as audio data to a secondary automated assistant via an application programming interface (API) 355. In some implementations, primary automated assistant 305 may first process the audio data to generate text which may then be provided to the secondary automated assistant 310 via API 355. In some implementations, primary automated assistant 305 may provide the audio data and/or a textual transcription of the query via a speaker. For example, primary automated assistant 305 may generate an ultrasonic signal that is inaudible to humans that may be captured by a microphone of the device executing a secondary automated assistant. This signal may be, for example, a processed version of the audio data that includes the query (e.g., the raw audio data processed to a higher frequency and/or a textual representation of the audio data that is transmitted via a speaker but inaudible to humans). In some implementations, audio data and/or textual representations of a query can be encoded prior to transmission such that only particular secondary automated assistants that can decode the information included in the transmission, thus allowing the primary automated assistant 305 to selectively provide the information to only the intended secondary automated assistant(s).

Each secondary automated assistant can be associated with one or more trust metrics that indicate a trust level that has been determined for that secondary automated assistant. In some implementations, a secondary automated assistant may be associated with a single trust metric that is indicative of the general trust level for that secondary automated assistant. In some implementations, a secondary automated assistant may be associated with multiple trust metrics, each of which indicates a trust level for the secondary automated assistant in receiving a particular type of query. For example, a secondary automated assistant may have a trust metric that indicates a trust level for processing "answers" and a second trust metric that indicates a trust level for processing "reservations" queries.

In some implementations, a trust metric for a secondary automated assistant can be based on past interactions of the user (or multiple users) with the secondary automated assistant. For example, referring to FIG. 3A, the user may interact with secondary automated assistant 310 more frequently than secondary automated assistant 315. In response, trust metric engine 335 may assign a trust metric value to secondary automated assistant 310 that is more indicative of trust than the trust metric value assigned to secondary automated assistant 315. Also, for example, the user may utilize secondary automated assistant 315 more frequently to make dinner reservations than secondary automated assistants 310 and 320. In response, a trust metric value for "reservations" queries for secondary automated assistant 315 may be assigned that is more indicative of trust in secondary automated assistant 315 for "reservations" queries than the trust metric value for "reservations" queries assigned to the other secondary assistants.

As another example, the user may rarely or never interact with secondary automated assistant 320. This could be due to the quality of past responses from secondary automated assistant 320 and/or that the user has forgotten that secondary automated assistant 320 has been installed on a device. In response, trust metric engine 340 may assign a trust metric value that is less indicative of trust than other secondary automated assistants that the user interacts with more frequently. However, in some instances, a secondary automated assistant may be specialized to handle only specific types of queries. To prevent an secondary automated assistant from being removed and/or ignored by the primary automated assistant 305 due to a low trust metric value, a trust metric value for those types of queries that can be handled by secondary automated assistant 320 may be unaffected by the lack of interaction of the user with secondary automated assistant 320.

In some implementations, a trust metric for a secondary automated assistant can be based on past interactions of users with instances of the secondary automated assistant. For example, a first instance of a secondary automated assistant may be utilized by multiple users. Trust metric values may be assigned to the secondary automated assistant based on all users' interactions with the secondary automated assistant. Also, for example, a second instance of the secondary automated assistant may be utilized by another user (or group of users) and the trust metric value assigned globally to the secondary automated assistant may be assigned based on multiple instances of the secondary automated assistant. Thus, the interactions of users with the first instance of the secondary automated assistant can affect the trust metric value assigned to the second secondary automated assistant.

Primary automated assistant 305 includes a query sensitivity engine 345 that determines whether the audio data includes information that may be potentially sensitive. Query sensitivity engine 345 can determine, based on content of a query provided by the user, whether the audio data includes personally identifiable information and/or other sensitive information that the user may have interest in preventing one or more secondary automated assistants from being provided. For example, a spoken query may include birth date, social security number, address, credit card information, calendar appointments, and/or other information that the user may not want to provide to all secondary automated assistants. However, in some instances, the user may have interest in some potentially sensitive information to be provided to some secondary automated assistants, or certain information may be necessary for some types of queries but not for others. Thus, query sensitivity engine 345 can determine what information is sensitive to prevent some secondary automated assistant from being provided information that is deemed potentially sensitive while allowing the same information to other secondary automated assistants.

Referring again to FIG. 3A, based on the trust metric of each of secondary automated assistants 310, 315, and 320, primary automated assistant 305 can determine what information to provide to each of the secondary automated assistants. For example, secondary automated assistant 310 may have a trust metric that indicates high trust (e.g., a trust metric value that exceeds a threshold value) and may be provided more information from a query than secondary automated assistant 315, which may have a medium trust metric value (e.g., below a "high" threshold and exceeding a "low" threshold value). Secondary automated assistant 315, in that instance, may be provided with less information than secondary automated assistant 315. Further, to continue the same example, secondary automated assistant 320 may have a low trust metric value (e.g., below a "medium" threshold value) and be provided even less information and/or not provided a query at all, if the trust value falls below a "low" threshold (e.g., an "untrusted" secondary automated assistant).

Sensitive information that is identified by query sensitivity engine 345 may be assigned values that indicate which secondary automated assistants can be provided with particular sensitive information based on the trust metrics of the secondary automated assistants. For example, audio data and/or a spoken query can include a social security number for a user, and that information may be classified with a sensitivity value that indicates that only "high" trusted secondary automated assistants receive the user's social security number. Further, even for highly trusted secondary automated assistants, a user may only have interest in providing a social security number for certain types of queries (e.g., making a doctor's appointment) and not for others (e.g., making a dinner reservation). Also, for example, a spoken query may include an address of the user, and the address may be assigned a sensitivity value that indicates that secondary automated assistants with at least a medium trust value (e.g., a value that exceeds a "medium" threshold value) be provided the address but that secondary automated assistants with a trust metric that does not meet or exceed the "medium" trust value may be prevented from receiving the user's address.

Primary automated assistant 305 further includes a query processing engine 360 that can process audio data into a processed query before providing the processed query to one or more secondary automated assistants. In some implementations, query processing engine 360 may perform ASR, STT, and/or NLU to generate a textual representation of the spoken query included in audio data and/or determine intent of the query. In some implementations, query processing may occur before determining sensitivity of information included in the spoken query. For example, query processing engine 360 may generate a textual representation of spoken query and query sensitivity engine 345 may utilize the textual representation to determine whether the query includes sensitive information. Also, for example, query processing engine 360 may generate NLU output that may be utilized to determine a classification for a given processed query.

Figure 4:
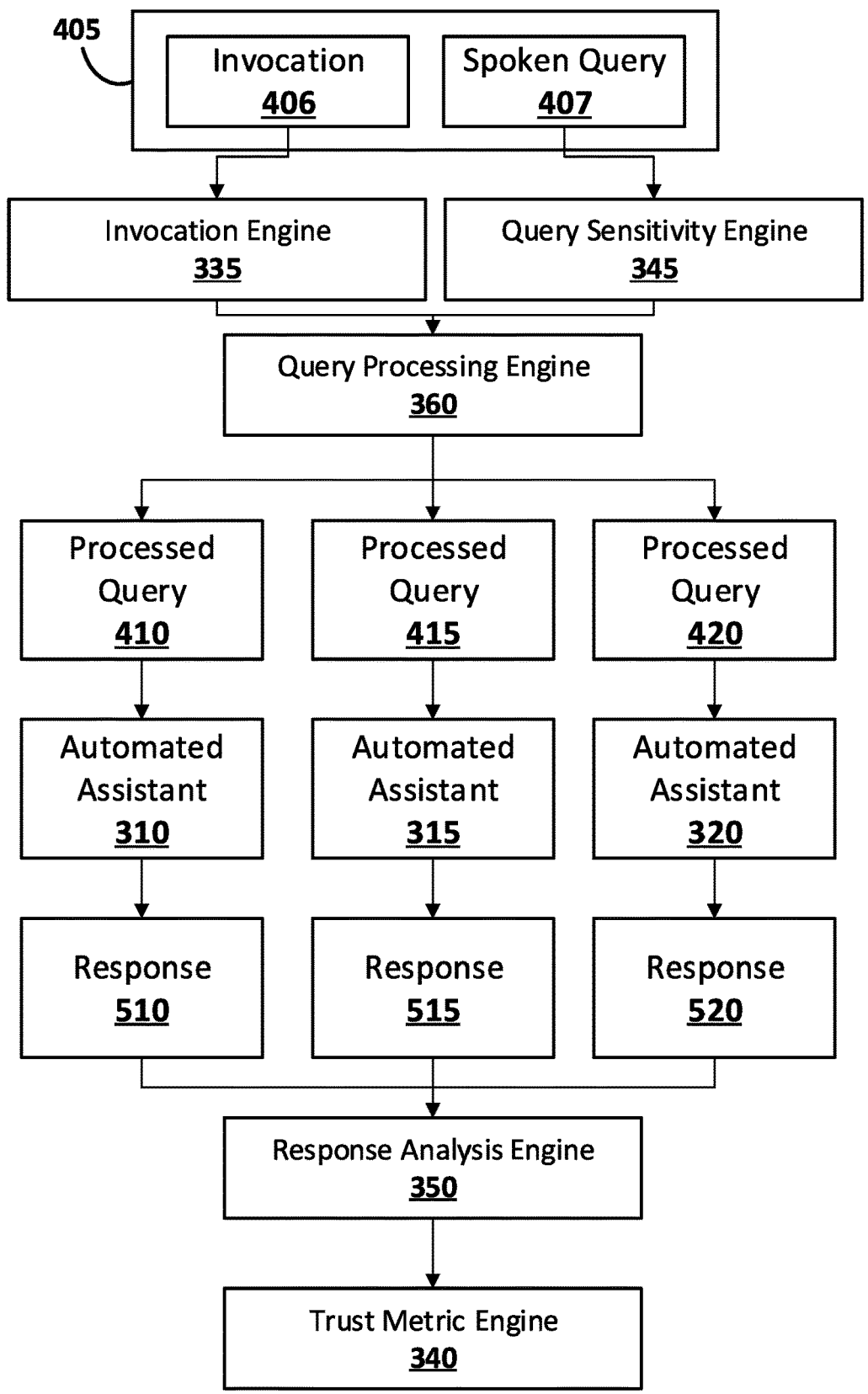
FIG. 4 is a flowchart illustrating generating a processed query, according to various implementations disclosed herein.

Referring to FIG. 4, a flowchart is provided that illustrates methods described herein. As previously described, invocation engine 335 receives audio data of a spoken utterance 405 of the user that invokes primary automated assistant 305. In some implementations, the spoken utterance includes both an invocation 406 and a query 407. In other implementations, the audio data 405 can include the spoken query 407 and additional audio (e.g., background noise, other users speaking) and not the invocation, such as when the invocation 406 is a non-verbal invocation. The audio data 405 is provided to the query sensitivity engine 345, which determines whether the spoken query 407 includes sensitive information and further determines a sensitivity level for identified sensitive information, as previously described. The query and sensitivity information can then be provided to the query processing engine 360 to process the query into a processed query for providing to one or more secondary automated assistants.

Once it is determined what information included in a query can be provided to each secondary automated assistant, query processing engine 360 can further process the query to prevent some portion of the information from being provided to one or more of the secondary automated assistants. As previously described, secondary automated assistants may have differing trust metrics whereby, for a given spoken query, each may be permitted to access some information while other secondary automated assistants may not be permitted to access the same information. For example, referring again to FIG. 4, query processing engine 360 may generate a first processed query 410 to provide to secondary automated assistant 310, a second processed query to provide to secondary automated assistant 415, and a third processed query 420 to provide to secondary automated assistant 320. Each of the processed queries can include some of the information included in spoken query 407 but with other portions of the query omitted and/or otherwise obfuscated.

In some instances, audio data may not be processed at all by query processing engine 360 and the audio data and/or spoken query may be provided in its entirety (e.g., provided to a secondary automated assistant with a trust metric value that exceeds a threshold). For example, referring to FIG. 5, examples of processed queries are provided. Query 407 is provided to query processing engine 360, which can determine what to provide as a processed query to each of the secondary automated assistants 310, 315, and 320. For the query 407, each of the provided processed queries 410, 415, and 420 includes different information. For the purposes of this example, secondary automated assistant 310 has a first trust metric, secondary automated 315 has a second trust metric that is less indicative of trust than secondary automated assistant 310, and secondary automated assistant 320 has a trust metric that is less indicative of trust than secondary automated assistant 315 (e.g., "high," "medium," and "low" trust metrics). As previously described with regards to secondary automated assistant 310, the query 407 is provided as processed query 410 without any of the information excluded and/or obfuscated. Processing, in this case, may include omitting background noise, omitting utterances that are not a part of the spoken query, adjusting prominence of the spoken query versus other portions of the audio, anonymizing the speaker of the spoken query, and/or other processing that does not affect the portion of the spoken utterance that includes the query 407.

In some implementations, processing the audio data can include omitting a portion of the audio data to generate the processed query. For example, query processing engine 360 can process the audio data that includes spoken query 407 such that a portion of the audio data is removed and the remaining portion(s) are included in the audio data. Secondary automated assistant 315 can then perform additional processing of the processed audio data, such as ASR, STT, and/or NLU and generate a response based on the remaining portions of the audio data. For example, in the case of query 407, the portion that includes "my doctor's" can be omitted from the audio data and a processed query of "Make a dinner reservation after my appointment. My number is 555-5555." As another example, the user may include information that is unnecessary for the type of query. In that instance, the unnecessary information may be omitted from the query such that, even with a trust metric value that would otherwise authorize the secondary automated assistant to possess the information, the information is omitted (e.g., "Make a dinner reservation at Restaurant. My address is 123 E. Main Street," and omitting the portion that includes the user's address).

In some implementations, processing the audio data to generate the processed query can include introducing additional audio into the audio data to mask at least a portion of the audio data. For example, processed query 415 includes an inaudible portion that masks the portion of the audio data that includes the phone number of the user. This may be because a phone number is unnecessary for performing the query and/or because the secondary automated assistant is not permitted to access the phone number of the user based on its trust metric value. The inaudible portion may be silence, white noise, alternative audio data, and/or other audible audio other than the portion that includes the sensitive information. Thus, when secondary automated assistant 315 performs ASR, STT, and/or NLU on the processed query, it will not include the sensitive information.

In some implementations, processing a query can include generating a textual representation of the audio data. For example, processed query 420 includes a transcription of the query without including the actual audio data that includes the query. In some implementations, processing a query can further include omitting at least a portion of the textual representation of the query. Secondary automated assistant 315 can then perform NLU and/or other processing on the textual representation of the query in order to generate a response.

In some implementations, processing the audio data can include anonymizing and/or generalizing at least a portion of the information included in a query. For example, referring again to processed query 415, query processing engine 360 has generated a processed query that does not include the information that the user has a doctor's appointment. Instead, the processed query includes "after 5 o'clock" in its place. Thus, based on its trust metric, secondary automated assistant 315 is not provided with the purpose for the desired dinner reservation time but instead is provided with enough information to make the dinner reservation (i.e., the necessary portion of the query) but not provided with sensitive information (i.e., unnecessary information for making a dinner reservation).

Figure 5:
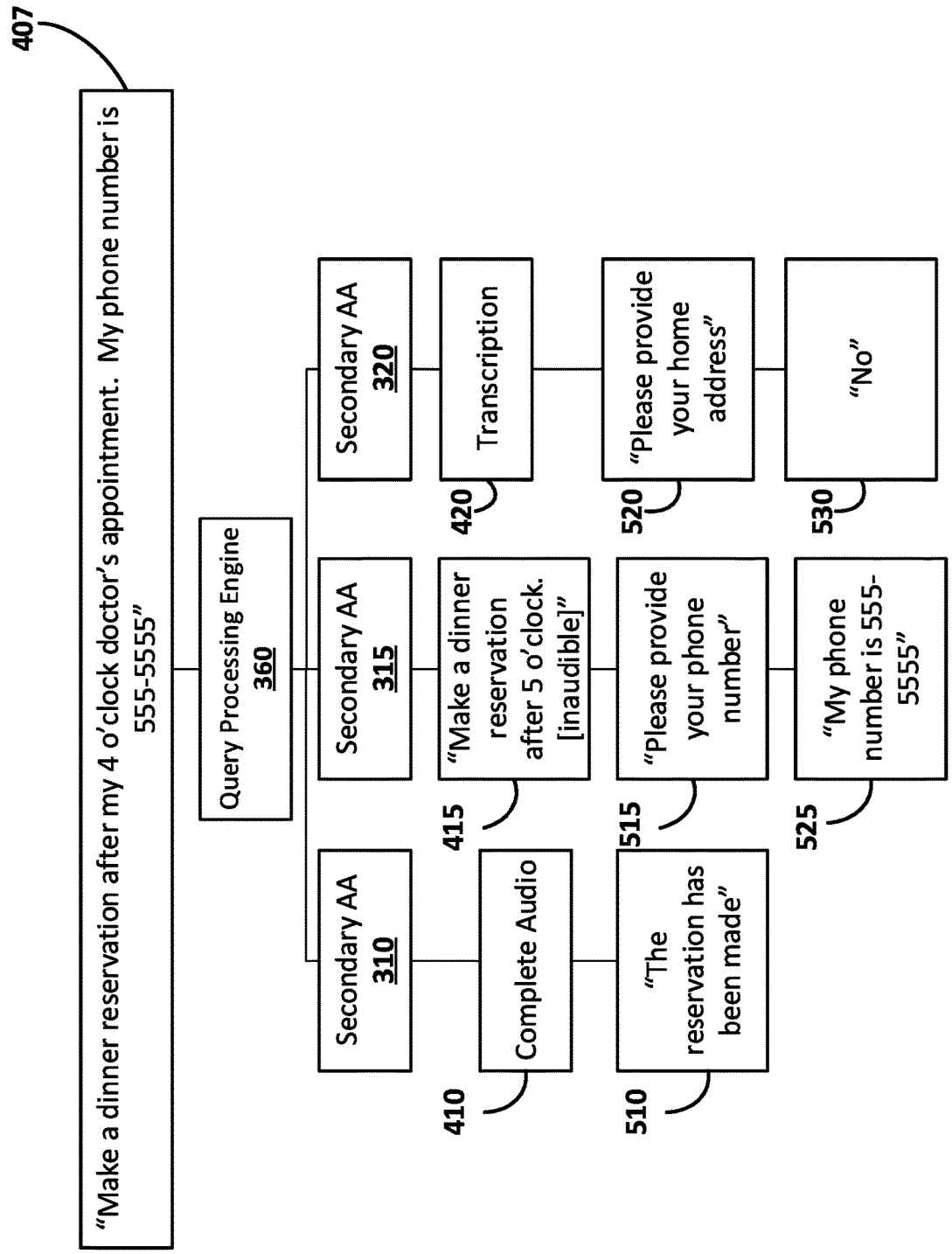
FIG. 5 is a flowchart illustrating audio data that includes a spoken query and processing the audio data to generate a processed query, according to various implementations disclosed herein.

Once primary automated assistant 305 has generated one or more processed queries, the processed queries can be provided to one or more of the secondary automated assistants. As illustrated in FIG. 5, different processed queries may be provided to each automated assistant based on the trust metrics of the automated assistants. The processed queries can be provided via an API, ultrasonic audio, and/or other communication protocols, as previously described.

In response to being provided with processed queries, each of the secondary automated assistants can process the received query and generate a response to the query. Processing the provided query can include, for example, the secondary automated assistant performing ASR, STT, and/or NLU on the query and utilizing a query processing engine that is configured to generate responses to queries. Also, for example, a secondary automated assistant may provide at least a portion of the query to one or more third party applications in order to generate a response (e.g., providing information to a dinner reservation application to make a dinner reservation). The response can be an audio response generated by the automated assistant via TTS and/or the response can be text. In some implementations, one or more of the secondary automated assistants that are provided a processed query may not provide a response. For example, a secondary automated assistant may not respond to a dinner reservation query if it is not authorized to perform that action and/or is not configured to interact with a dinner reservation application. Also, for example, a secondary automated assistant may be configured to only receive information and not to respond to queries.

In some implementations, one or more of the secondary automated assistants that were provided a processed query can provide the primary automated assistant with a generated response to the query. For example, referring again to FIG. 4, response analysis engine 350 can receive the responses 510, 515, and 520 from the secondary automated assistants 310, 315, and 320. In some instances, a response from a secondary automated assistant can include an answer and/or a confirmation that an action has been performed. For example, referring again to FIG. 5, response 510 indicates that a reservation has been successfully booked.

In some implementations, a secondary automated assistant may not provide a response to a processed query. For example, the secondary automated assistant may not be configured to respond to the classification of query that was provided by the primary automated assistant and/or the secondary automated assistant may not have determined a suitable answer and/or was unable to perform the requested action. In those instances, the secondary automated may not provide a response at all or may provide a response indicating that it could not successfully generate a response (e.g., "I'm sorry, I can't perform that action").

In some implementations, a response that is received from a secondary automated assistant may include a request for additional information. For example, referring again to FIG. 5, secondary automated assistant 315 has provided a response of "Please provide your phone number" since the provided query did not include the phone number of the user. In some implementations, the follow-up query of the secondary automated assistant may be for additional information that is required to perform the requested action and that the secondary automated assistant has authorization to access. In some implementations, the secondary automated assistant may request information that is unrelated to the provided query and/or is unnecessary to fulfill the request (e.g., a request for a social security number for a request to make dinner reservations).

Referring again to FIG. 3B, primary automated assistant 305 includes a response analysis engine 360 that can analyze the responses received from secondary automated assistants. In some implementations, the primary automated assistant 305 can determine which response from a secondary automated assistant best fulfills the query provided by the user. For example, referring again to FIG. 5, primary automated assistant 305 may be provided with response 510, 515, and 520. As illustrated, response 510 indicates a successful fulfillment of the query, whereas both response 515 and 520 are requests for additional information. In this instance, response analysis engine 360 may determine that the best response is response 510 and provide that response to the user. In some implementations, a response may be for additional information that the originating secondary automated assistant is not authorized to be provided and/or is unnecessary in order to fulfill the request (e.g., social security number request to make a dinner reservation). In that instance, response analysis engine 360 may determine not to provide that response to the user.

In some implementations, primary automated assistant 305 can determine whether a response to a query is authorized based on the trust metric associated with the secondary automated assistant that provided the response. For example, a secondary automated assistant may provide a response that includes a request for additional information. Primary automated assistant 305 can determine, based on the trust metric of the secondary automated assistant, whether the secondary automated assistant is authorized to receive the information that is requested. Referring to FIG. 5, secondary automated assistant 315 has provided response 515 that includes a request for a phone number of the user. If the trust metric of the secondary automated assistant 315 is below a threshold whereby it is permitted to be provided with the phone number of the user, the response analysis engine 350 may exclude the response from further consideration in determining what response to provide to the user. As illustrated, the user has responded with a response 525 that includes the user's phone number. Thus, in some instances, a secondary automated assistant may be provided with information that it otherwise would not be able to access when the user has explicitly provided that information in order for the secondary automated assistant to fulfill a request.

In some implementations, trust metric engine 340 can adjust one or more of the trust metrics associated with a secondary automated assistant based on the analysis of the response analysis engine 350. In some implementations, as the user (or users) interact with a secondary automated assistant, one or more actions of the user may be indicative of trust of the user in utilizing the secondary automated assistant. For example, a user may not frequently interact with a secondary automated assistant and/or may not interact with a secondary automated assistant at all. In those instances, the trust metric of the secondary automated assistant may be adjusted to indicate that the automated assistant is less trusted, thereby limiting access by the secondary automated assistant to potentially sensitive information. As another example, the user may not respond (or respond in the negative) to a response of a secondary automated assistant, and the trust metric of the secondary automated assistant may be adjusted to a value that is less indicative of trust in the secondary automated assistant, thereby making responses from that secondary automated less likely to be provided to the user, especially if the response includes a request for additional information that the secondary automated assistant is not permitted to access. Referring again to FIG. 5, secondary automated assistant 320 has provided a response of "Please provide your home address," to which the user has responded 530 with "no." In response, trust metric engine 340 may adjust the trust metric of secondary automated assistant 320 to be less indicative of trust based on the user responding negatively to the request of secondary automated assistant 320.

In some implementations, one or more actions of a secondary automated assistant may be indicative of trust (or lack thereof) that is appropriate for the secondary automated assistant. For example, a secondary automated assistant may generate a request for additional information that it is not authorized to access and/or that is unnecessary for the query that was received from the primary automated assistant (e.g., asking for a social security number for making a dinner reservation). The trust metric of the secondary automated assistant may be adjusted to a level that is less indicative of trust to further limit access by the secondary automated assistant to information of the user. Also, for example, a secondary assistant may generate one or more responses that indicate that it is unable to process a query that includes potentially sensitive information (e.g., "I can't help with that"), and the trust metric can be adjusted based on identifying that the automated assistant has been provided with the potentially sensitive information but is not utilizing the sensitive information to perform an intended action and/or provide an intended response (e.g., lower the trust metric based on repeated failed responses).

In some implementations, trust metric engine 340 can adjust a trust metric for a secondary automated assistant based on one or more other properties of responses from a user. For example, trust metric engine 340 can adjust a trust metric for a secondary automated assistant based on latency in a user responding to an automated assistant (e.g., a longer response time may be indicative of trust of the user in responding to a request for additional information). Also, for example, trust metric engine 340 can adjust a trust metric based on computational resources required to process a response and/or process a request for additional information that is generated by the automated assistant.

In some implementations, trust metric engine 340 can adjust a trust metric of a secondary automated assistant based on similarity of one response to one or more other responses. For example, response analysis engine 350 may determine that a response from a first secondary automated assistant, with a first trust metric, is within a threshold similarity to a response from a second secondary automated assistant (e.g., generate a vector for each response in an embedding space and compare the vectors), wherein the second trust metric is lower than the first trust metric. Trust metric engine 340 may adjust the second trust metric to be more indicative of trust based on determining that its responses are similar to responses from a more trusted secondary automated assistant.

In some implementations, response metric engine 340 can adjust a trust metric of a secondary automated assistant based on determining that a secondary automated assistant is attempting to, either maliciously or inadvertently, model its response on a different secondary automated assistant. For example, a secondary automated assistant may generate an audio response that mimics an audio response from a different automated assistant, such as using the same voice, including an indication of a secondary automated assistant other than the one that is providing the response, and/or other mimicking behavior that could cause confusion by the user regarding the origin of the response.

In some implementations, when a trust metric for a secondary automated assistant falls below a threshold, the user may be alerted that the secondary automated assistant may not be trusted. Additionally or alternatively, the secondary automated assistant may be deactivated and/or uninstalled to further limit access to potentially sensitive information. For example, a secondary automated assistant may be consistently requesting additional information that it is not authorized to be provided and/or requesting information that is unneeded to respond to the provided queries. As the trust metric for the secondary automated assistant is lowered, the trust metric may fall below a threshold trust level and the user may be alerted, the secondary automated assistant may be deactivated, and/or the secondary automated assistant may be uninstalled from the user device.

Figure 6:
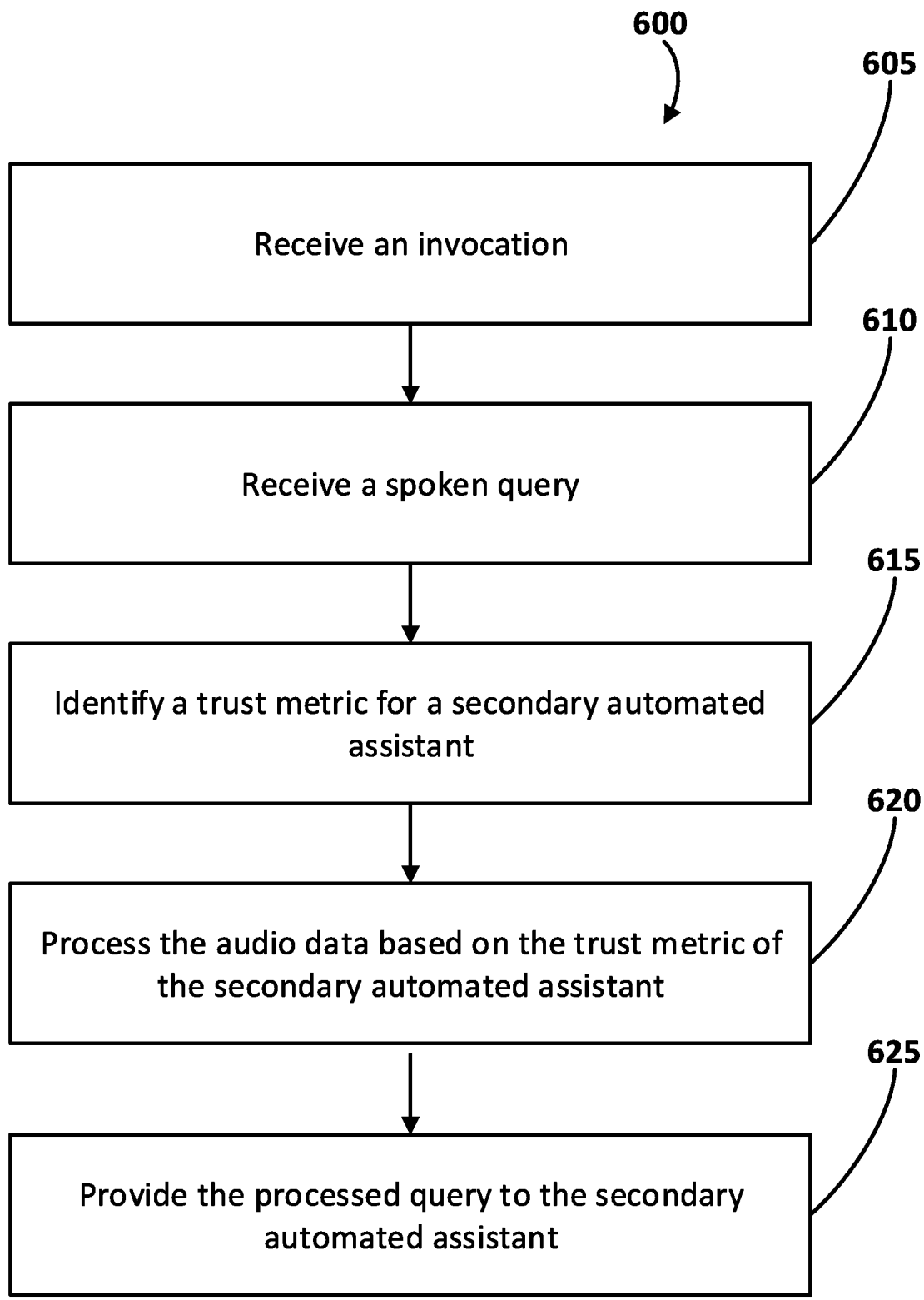
FIG. 6 is a flowchart illustrating an example method according to various implementations disclosed herein.

FIG. 6 depicts a flowchart illustrating an example method 600 of detecting sensitive information in user queries. For convenience, the operations of the method 600 are described with reference to a system that performs the operations. This system of method 600 includes one or more processors and/or other component(s) of a client device. Moreover, while operations of the method 600 are shown in a particular order, this is not meant to be limiting. One or more operations may be reordered, omitted, or added.

At step 605, an invocation is received by the general automated assistant. The general automated assistant may be a primary automated assistant, as described herein. For example, the general automated assistant may be a primary automated assistant that is configured to be invoked by an invocation, such as a particular phrase, gesture by the user, and/or other action. The general automated assistant can be an automated assistant that is not configured to generate responses to queries, but instead is configured to provide queries to other secondary automated assistants for further processing. In some implementations, the general automated assistant may share one or more characteristics with the primary automated assistant 305.

At step 610, the general automated assistant receives audio data that captures a spoken query of the user. The spoken query can be a request for an automated assistant to perform one or more actions. For example, the spoken query can include a request for an answer to a query, for the secondary automated assistant to interact with one or more other applications, and/or one or more other actions that can be performed by a secondary automated assistant that is configured to perform the requested action.

At step 615, a trust metric for a secondary automated assistant is identified. The trust metric for a secondary automated assistant can be based on past interactions of one or more users with instances of the secondary automated assistant. For example, the trust metric for a secondary automated assistant can be based on a user or users interacting with a single instance of the secondary automated assistant. Also, for example, the trust metric for a secondary automated assistant can be based on multiple users interacting with multiple instances of the secondary automated assistant, each installed on a different client device.

At step 620, the audio data is processed based on the trust level to generate a processed query. Processing the query can include, for example, omitting a portion of the audio data that includes the spoken query, masking a portion of the spoken query, generating a textual representation of the query, generalizing one or more terms in the query, and/or other actions that can obfuscate, mask, and/or omit at least a portion of the information included in the query.

At step 625, the processed query is provided to the secondary automated assistant. The processed query can be provided as audio data, as a textual representation of the spoken query, and/or as NLU output. In some implementations, the general automated assistant can provide the query via one or more APIs, via an audible signal that is broadcast via the speaker of the device that is executing the general automated assistant, and/or via other communication protocols. In some implementations, the processed query is provided to multiple secondary automated assistants for processing. Multiple automated assistants may each be provided with a different version of the spoken query, each processed differently based on the trust metric of the receiving secondary automated assistant.

Figure 7:
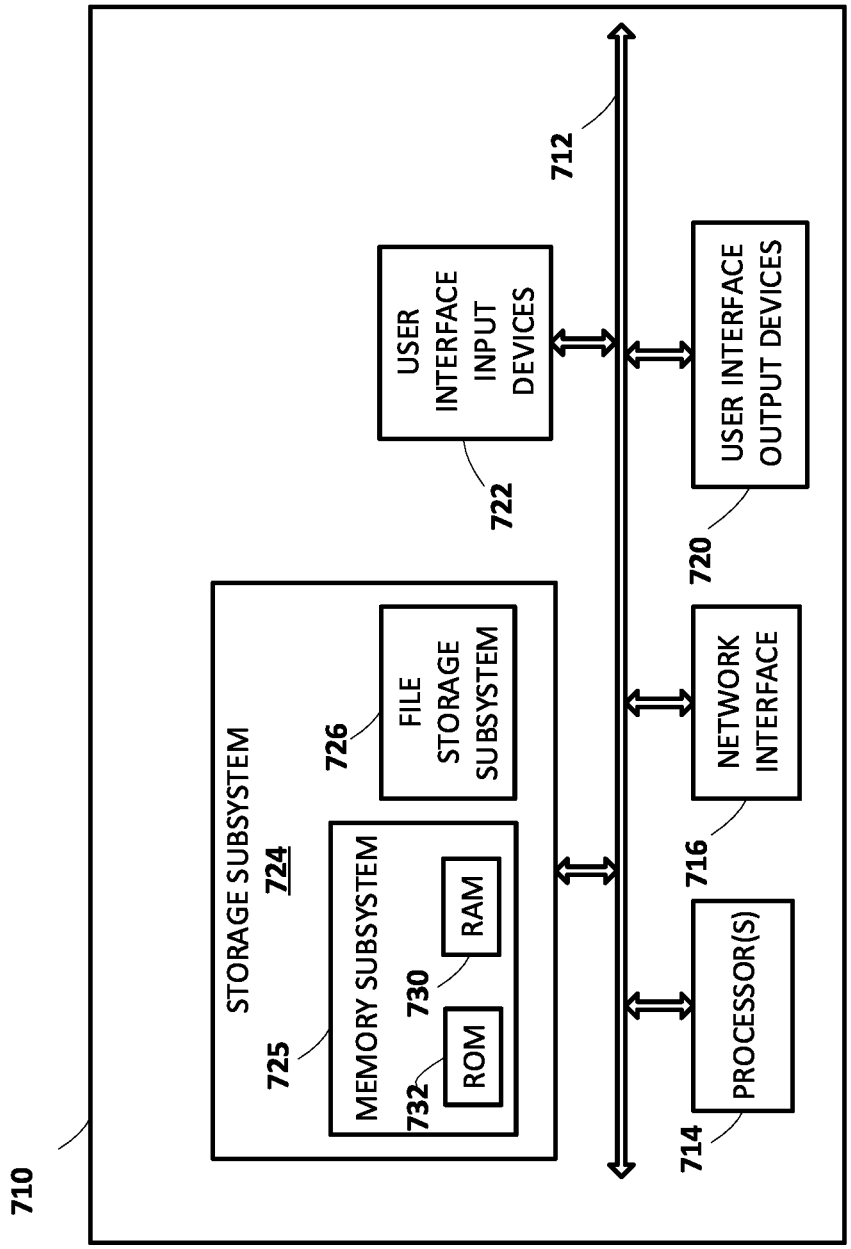
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods of FIG. 5 and FIG. 6, and/or to implement various components depicted in FIG. 2 and FIG. 3.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In some implementations, a method implemented by one or more processors is provided and includes receiving, by a general automated assistant, an invocation, wherein receiving the invocation causes the general automated assistant to be invoked; receiving, via the general automated assistant and responsive to being invoked, audio data that captures a spoken query and that is generated by one or more microphones of the client device; identifying a trust metric for a secondary automated assistant, wherein the trust metric is based on past interactions of one or more users with instances of the secondary automated assistant; processing, by the general automated assistant, the audio data based on the trust metric to generate a processed query; and providing the processed query to the secondary automated assistant.

These and other implementations of the technology disclosed herein can include one or more of the following features.

In some implementations, the method further includes identifying an additional trust metric for an additional secondary automated assistant, wherein the additional trust metric is based on past interactions of one or more users with instances of the additional secondary automated assistant; processing, by the general automated assistant, the audio data based on the additional trust metric to generate an additional processed query, wherein the additional processed query is different than the processed query; and providing the additional processed query to the additional secondary automated assistant. In some of those implementations, the processed query comprises at least part of the audio data and the additional processed query lacks any of the audio data, but comprises at least some speech recognition results generated based on the audio data and/or natural language understanding data generated based on the at least some speech recognition results. In other of those implementations, the processed query comprises a given portion of the audio data, and the additional processed query lacks the given portion of the audio data or includes an obfuscated version of the given portion of the audio data.

In some implementations, processing the spoken query based on the additional trust metric to generate the additional processed query includes determining, based on the additional trust metric, to omit certain features from the processed query; determining that the given portion includes the certain features; and responsive to determining the given portion includes the certain features, removing the given portion of the audio data from the additional processed query or obfuscating the given portion of the audio data from the additional processed query. In some of those implementations, determining that the given portion includes certain features includes determining that the given portion includes sensitive information.

In some implementations, the processed query comprises speech recognition results for a certain portion of the audio data, and the additional processed query lacks the speech recognition results for the certain portion of the audio data.

In some implementations, processing the audio data based on the trust level includes: identifying sensitive information included in the spoken query; and responsive to the trust level failing to satisfy a threshold, the method further includes omitting the sensitive information from the processed query. In some of those implementations, processing the audio data includes: determining a type of sensitive information included in the spoken query, wherein the threshold is based on the type of sensitive information. In other of those implementations, processed query includes a first subset of the audio data but omits a second subset of the audio data, wherein the second subset of the audio data includes the sensitive information, and wherein omitting the sensitive information from the processed query includes omitting the second subset of audio data. In yet other of those implementations, the processed query includes a first subset of the audio data and a second subset of the audio data, wherein the second subset of the audio data includes the sensitive information, and wherein omitting the sensitive information from the processed query includes obfuscating the second subset of the audio data. In some of those implementations, obfuscating the second subset of audio data includes: determining a generalization of at least a portion of the second subset of audio data, wherein obfuscating the second subset of the audio data includes replacing the second subset of audio data with the generalization.

In some implementations, processing the audio data includes generating, using automatic speech recognition, text that is indicative of the spoken query.

In some implementations, the method further includes receiving a response from the secondary automated assistant; determining that the response does not fulfill an intent of a user that uttered the spoken query; and in response to determining that the response does not fulfill the intent of the user: preventing the response from being provided to the user that uttered the spoken query.

In some implementations, the method further includes receiving a response from the secondary automated assistant, wherein the response includes a request that the user that uttered the spoken query provide additional information; determining, based on the trust level, that the secondary automated assistant is not authorized to receive the requested additional information; and in response to determining that the secondary automated assistant is not authorized to receive the requested additional information: preventing the response from being provided to the user that uttered the spoken query.

In some implementations, the method further includes receiving, in response to providing the spoken query to the secondary automated assistant, a request for additional information; providing the request to the user that uttered the spoken query; and in response to providing the request, identifying a subsequent response to the request from the user that uttered the spoken query and adjusting the trust level based on the subsequent response.

In some implementations, another method implemented by one or more processors is provided and includes, responsive to detecting occurrence of an assistant invocation event at a client device: processing, by a general automated assistant, audio data that captures a spoken query of a user and that is generated by one or more microphones of the client device; identifying a previously generated trust metric for a secondary automated assistant; and determining whether the trust metric for the secondary automated assistant satisfies a threshold. In response to determining the trust metric satisfies the threshold, the method further includes providing, to the secondary automated assistant, first content that is based on the audio data. In response to determining that the trust metric fails to satisfy the threshold, the method further includes providing second content that is based on the audio data, wherein the second content differs from the first content.

These and other implementations of the technology disclosed herein can include one or more of the following features.

In some implementations, the first content includes at least part of the audio data and wherein the second content omits or obfuscates at least part of the audio data.

In some implementations, another method implemented by one or more processors is provided and includes receiving, by a general automated assistant, an invocation, wherein receiving the invocation causes the general automated assistant to be invoked; receiving, via the invoked general automated assistant, audio data that captures a spoken query and that is generated by one or more microphones of the client device; determining a classification of the spoken query; identifying a trust metric for a secondary automated assistant and for the classification, wherein the trust metric is specific to the secondary automated assistant and to the classification and is based on past interactions of one or more users with instances of the secondary automated assistant and for the classification; processing, by the general automated assistant, the spoken query based on the trust metric to generate a processed query; and providing the processed query to the secondary automated assistant.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors of a client device, the method comprising:
   receiving, by a general automated assistant, an invocation, wherein receiving the invocation causes the general automated assistant to be invoked;
   receiving, via the general automated assistant and responsive to being invoked, audio data that captures a spoken query that includes one or more features and that is generated by one or more microphones of the client device;
   identifying a trust metric for a secondary automated assistant, wherein the trust metric is based on past interactions of one or more users with instances of the secondary automated assistant;
   processing, by the general automated assistant, the audio data based on the trust metric to generate a processed query, wherein the processed query omits one or more of the features of the spoken query and/or obfuscates one or more of the features of the spoken query; and
   providing the processed query to the secondary automated assistant.

2. The method of claim 1, further comprising:
   identifying an additional trust metric for an additional secondary automated assistant, wherein the additional trust metric is based on past interactions of one or more users with instances of the additional secondary automated assistant;
   processing, by the general automated assistant, the audio data based on the additional trust metric to generate an additional processed query, wherein the additional processed query is different than the processed query; and
   providing the additional processed query to the additional secondary automated assistant.

3. The method of claim 2, wherein the processed query comprises at least part of the audio data, and wherein the additional processed query lacks any of the audio data, but comprises at least some speech recognition results generated based on the audio data and/or natural language understanding data generated based on the at least some speech recognition results.

4. The method of claim 2, wherein the processed query comprises a given portion of the audio data, and wherein the additional processed query lacks the given portion of the audio data or includes an obfuscated version of the given portion of the audio data.

5. The method of claim 4, wherein processing the spoken query based on the additional trust metric to generate the additional processed query comprises:
   determining, based on the additional trust metric, to omit certain features, of the one or more features of the spoken query, from the processed query;
   determining that the given portion includes the certain features; and
   responsive to determining the given portion includes the certain features:
      removing the given portion of the audio data from the additional processed query or obfuscating the given portion of the audio data from the additional processed query.

6. The method of claim 5, wherein determining that the given portion includes the certain features comprises determining that the given portion includes sensitive information.

7. The method of claim 2, wherein the processed query comprises speech recognition results for a certain portion of the audio data, and wherein the additional processed query lacks the speech recognition results for the certain portion of the audio data.

8. The method of claim 1, wherein processing the audio data based on the trust metric includes:
   identifying sensitive information included in the spoken query, wherein omitting one or more of the features of the spoken query from the processed query is responsive to the trust metric failing to satisfy a threshold and wherein one or more of the features of the spoken query omitted from the processed query include the sensitive information.

9. The method of claim 8, wherein processing the audio data includes:
   determining a type of sensitive information included in the spoken query, wherein the threshold is based on the type of sensitive information.

10. The method of claim 8, wherein the processed query includes a first subset of the audio data but omits a second subset of the audio data, wherein the second subset of the audio data includes the sensitive information, and wherein omitting the sensitive information from the processed query includes omitting the second subset of audio data.

11. The method of claim 8, wherein the processed query includes a first subset of the audio data and a second subset of the audio data, wherein the second subset of the audio data includes the sensitive information, and wherein omitting the sensitive information from the processed query includes obfuscating the second subset of the audio data.

12. The method of claim 11, wherein obfuscating the second subset of audio data includes:
   determining a generalization of at least a portion of the second subset of audio data,
   wherein obfuscating the second subset of the audio data includes replacing the second subset of audio data with the generalization.

13. The method of claim 1, wherein processing the audio data includes:
   generating, using automatic speech recognition, text that is indicative of the spoken query.

14. The method of claim 1, further comprising:
   receiving a response from the secondary automated assistant;
   determining that the response does not fulfill an intent of a user that uttered the spoken query; and
   in response to determining that the response does not fulfill the intent of the user:
      preventing the response from being provided to the user that uttered the spoken query.

15. The method of claim 1, further comprising:
   receiving a response from the secondary automated assistant, wherein the response includes a request that the user that uttered the spoken query provide additional information;
   determining, based on the trust metric, that the secondary automated assistant is not authorized to receive the requested additional information; and
   in response to determining that the secondary automated assistant is not authorized to receive the requested additional information:
      preventing the response from being provided to the user that uttered the spoken query.

16. The method of claim 1, further comprising:
   receiving, in response to providing the spoken query to the secondary automated assistant, a request for additional information;

providing the request to the user that uttered the spoken query;

in response to providing the request, identifying a subsequent response to the request from the user that uttered the spoken query; and adjusting the trust metric based on the subsequent response.

17. A method implemented by one or more processors of a client device, the method comprising:

receiving, by a general automated assistant, an invocation, wherein receiving the invocation causes the general automated assistant to be invoked;

receiving, via the invoked general automated assistant, audio data that captures a spoken query and that is generated by one or more microphones of the client device;

determining a classification of the spoken query;

identifying a trust metric for a secondary automated assistant and for the classification, wherein the trust metric is specific to the secondary automated assistant and to the classification and is based on past interactions of one or more users with instances of the secondary automated assistant and for the classification;

processing, by the general automated assistant, the spoken query based on the trust metric to generate a processed query; and providing the processed query to the secondary automated assistant.

18. A system comprising:

memory storing instructions; and one or more processors operable to execute the instructions to:

receive, by a general automated assistant, an invocation, wherein receiving the invocation causes the general automated assistant to be invoked;

receive, via the general automated assistant and responsive to being invoked, audio data that captures a spoken query that includes one or more features and that is generated by one or more microphones of the client device;

identify a trust metric for a secondary automated assistant, wherein the trust metric is based on past interactions of one or more users with instances of the secondary automated assistant;

process, by the general automated assistant, the audio data based on the trust metric to generate a processed query, wherein the processed query omits one or more of the features of the spoken query and/or obfuscates one or more of the features of the spoken query; and provide the processed query to the secondary automated assistant.

19. The system of claim 18, wherein in processing the audio data, one or more of the processors are to:

generate, using automatic speech recognition, text that is indicative of the spoken query.

* * * * *